US00RE35780E

United States Patent [19]

Hassell et al.

[11] E Patent Number: Re. 35,780

[45] Reissued Date of Patent: May 5, 1998

[54] CONSTANT RATIO POST-MIX BEVERAGE DISPENSING VALVE

[75] Inventors: David A. Hassell; David C. Anderson, both of Anoka, Minn.

[73] Assignee: IMI Cornelius Inc., Anoka, Minn.

[21] Appl. No.: 326,174

[22] Filed: Oct. 19, 1994

Related U.S. Patent Documents

Reissue of:

[64] Patent No.: 5,156,301
Issued: Oct. 20, 1992
Appl. No.: 628,818
Filed: Dec. 17, 1990

[51] Int. Cl.[6] ..... B67D 5/56

[52] U.S. Cl. ..... 222/129.2; 417/405; 137/99

[58] Field of Search ..... 222/129.1–129.4, 222/133, 135, 136, 145.1; 137/98, 99; 417/405

[56] References Cited

U.S. PATENT DOCUMENTS

| | | | |
|---|---|---|---|
| 3,348,787 | 10/1967 | Yingst et al. | 222/129.1 X |
| 3,750,908 | 8/1973 | Bauerlein et al. | 222/129.2 X |
| 4,109,831 | 8/1978 | Culpepper et al. | 222/254 |
| 4,128,190 | 12/1978 | Gruber | 222/129.2 |
| 4,163,510 | 8/1979 | Strenger | 222/129.2 |
| 4,181,242 | 1/1980 | Zygiel et al. | 222/129.2 X |
| 4,684,332 | 8/1987 | Hartley et al. | 222/129.2 X |
| 4,767,033 | 8/1988 | Gemperle | 222/383.2 |
| 4,795,061 | 1/1989 | Peckjian | 222/129.2 |
| 4,854,482 | 8/1989 | Bergner | 222/135 |
| 4,931,249 | 6/1990 | Hune | 222/136 X |
| 4,932,564 | 6/1990 | Austin et al. | 222/129.2 |
| 4,940,165 | 7/1990 | McMillin | 222/129.1 |
| 4,953,754 | 9/1990 | Credle, Jr. | 222/129.2 |
| 5,000,352 | 3/1991 | Cleland | 222/129.2 |
| 5,012,837 | 5/1991 | Zepp | 222/129.2 X |

FOREIGN PATENT DOCUMENTS

| | | |
|---|---|---|
| 0326510 | 8/1989 | European Pat. Off. . |
| 7929368 | 7/1980 | France . |
| 3929508A1 | 3/1990 | Germany . |
| 1074167 | 6/1976 | Italy . |
| WO8804984 | 7/1988 | WIPO . |

*Primary Examiner*—Kevin P. Shaver
*Attorney, Agent, or Firm*—Sten Erik Hakanson

[57] ABSTRACT

The present invention is a post-mix beverage dispensing valve for accurately maintaining the proper ratio of two liquid beverage components. The present invention includes a valve main body having a gear pump secured thereto. The gear pump includes two sets of oval gears. One set of oval gears is in fluid communication with a source of pressurized carbonated water, and the second set is in fluid communication with a source of syrup. The valve body also includes solenoid operated pallet valves for each of the beverage components. Ratioing of the solenoid provides for simultaneous opening of both pallet valves whereby the pressurized carbonated water flows between the carbonated water gears and is swept thereby through the valve body to the dispensing nozzle. One gear of each gear pair is secured to a common rotating shaft. Pressurized carbonated water provides for the rotation of the syrup gears, thereby providing for the pumping of the syrup to the nozzle. The gear pairs are sized so that the desired ratio between the beverage components is maintained.

27 Claims, 4 Drawing Sheets

CONSTANT RATIO POST-MIX BEVERAGE DISPENSING VALVE

Matter enclosed in heavy brackets [ ] appears in the original patent but forms no part of this reissue specification; matter printed in italics indicates the additions made by reissue.

BACKGROUND

1. Field of the Invention

The present invention relates generally to post-mix beverage dispensing valves and, in particular, to post-mix beverage dispensing valves that automatically maintain the proper ratio of two beverage components.

2. Background of the Invention

Post-mix beverage dispensing valves that provide for the proper ratioing of a mixture of, for example, carbonated water and syrup to produce a dispensed beverage, are well known in the art. Such prior art valves generally consist of a valve body having separate channels therethrough for the delivery of beverage constituents separately to a valving mechanism for ultimate delivery through a mixing nozzle to a suitable receptacle. To provide for the proper beverage mixture, post-mix beverage dispensing valves of this type include flow controls in each of the beverage constituent lines. The flow controls are generally of the piston, needle valve or flow washer type. When properly adjusted, such flow controls maintain the desired ratio or brix quite well. However, it has been found that differences in ambient temperature, the delivery pressures of the drink constituents and mechanical wear of the flow controls can contribute to an improperly mixed drink.

A mechanical approach to automatic brix control is known wherein doubling acting pistons are linked together so they operate simultaneously. The proper ratio is maintained whereby the volumes of the pistons are at the desired ratio, typically five to one for a mixture of carbonated water and syrup. In this manner, five volumes of water and one volume of syrup are pumped for each stroke of the pistons in each direction. This approach works relatively well when large volumes of, for example, water and syrup are mixed. Difficulties have been experienced with respect to reduction in size sufficient to fit within the dimensions of a typical post-mix dispensing valve. In addition, such a system has proven to be expensive to manufacture.

Other automatic ratioing approaches have been proposed wherein the ambient temperature and/or pressures of the beverage constituents are independently monitored and adjusted accordingly. However, such systems suffer primarily from complexity and high cost.

Accordingly, it would be highly desirable to have a post-mix beverage dispensing valve that automatically maintains the desired ratio of beverage constituents and that is easy and inexpensive to manufacture and operate.

SUMMARY OF THE INVENTION

The present invention is a post-mix beverage dispensing valve that automatically maintains the desired ratio between two beverage components. The present invention includes a valve body having a pair of beverage constituent fluid pathways extending therethrough from an attachment end to a valving end. Pallet valves are provided and operated by a single solenoid for delivering the beverage constituents simultaneously to a beverage nozzle wherein they are mixed and dispensed into a suitable receptacle. A gear pump is releasably secured to the valve main body and includes a pair of water and syrup inlets and a corresponding pair of water and syrup outlets. The water inlet and outlet thereof are in fluid communication with the water channel extending through the main valve body. Likewise, the syrup inlet and outlet are in fluid flow communication with the syrup channel. The gear pump includes two pairs of elliptical or oval gears. The syrup inlet and outlet channels are in fluid communication with one pair of syrup gears, and the carbonated water inlet and outlet channels are in fluid communication with the remaining pair of carbonated water gears. One of the gears from each set is connected to and keyed to a rotating axle and each of the remaining gears are free to rotate on a fixed shaft. Each gear pair rotates in its own housing, fluidly separate from the other gear pair.

In operation, pressurized carbonated water is provided to the carbonated water inlet and is delivered centrally of the two carbonated water gears for providing rotation thereof. The carbonated water then flows out the carbonated water outlet to the carbonated water channel for delivery to the pallet valve mechanism. It can be understood that, as one of the gears of each set is on a common rotating shaft, the pressurized carbonated water provides for the driving force for the syrup gear pair. The gear pairs are dimensioned such that, for each revolution of the gear pairs, five volumes of water are delivered to the valve nozzle for each one volume of syrup. It can now be appreciated that the present invention automatically provides for the proper ratio between the carbonated water and syrup by virtue of the dimensioning of the gear pairs. Moreover, such ratio is maintained regardless of the rotation rate of the gear pairs. In addition, as the syrup gears act as a pump, it is not necessary to pressurize the syrup for the delivery thereof to the value.

BRIEF DESCRIPTION OF THE DRAWINGS

Other objects and advantages of the present invention can be understood by reference to the following detailed description, which refers to the following figures, wherein.

Figure 5:
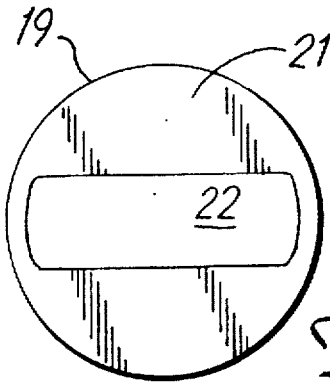
FIG. 5 shows a top surface view of a flow control cavity plug.

As seen by referring to the various figures, the present invention is generally designated by the number 10. Valve 10 includes a main valve body 12 and valve housing or cover 13. Valve body 12 includes an inlet water channel 14 having a inlet orifice 16 for fluid communication with a pressurized source of carbonated water (not shown). Valve body 12 further includes a carbonated water out channel 17 and a flow control cavity 18 having a flow control plug 19 releasably inserted therein. As seen by also referring to FIG. 5, plug 19 includes a pair of O-rings 20 and a top surface 21 having a groove 22 formed therein. Valve body 12 includes a seat 23 for retaining a flow washer 24. *Channel 17 provides for fluid communication from cavity 18 to a pallet valve 25.* In a similar manner, body 12 includes a syrup inlet channel 26 having an orifice 28 for communication with a source of syrup (not shown). Valve body 12 further includes a syrup outlet channel 30 and a syrup flow control cavity 32. It will be understood that cavity 32 also includes a plug 19 as previously described, and may optionally include a flow control means, as will be described in greater detail below. Channel 30 provides for fluid communication from cavity 32 to a syrup pallet valve 34.

A solenoid 36 is secured to valve body 12 and includes a operating rod 38. A valve operating arm 40 is pivotally secured to valve body 12 and provides for contact with pallet valve arms 42. Pallet valves [24] *25* and 34 are secured between valve body 12 and a valve block 44. Valve block 44, as is known in the art, includes separate seats upon which the pallet valves operate for delivery of carbonated water and syrup to a nozzle 50. Nozzle 50 is secured to a lower plate 52 and includes a diffuser 54 therein for the mixing of the carbonated water and syrup prior to dispensing into a suitable receptacle. In the present embodiment, plate 52 is secured to body 12 by a plurality of screws (not shown) and serves to hold block 44 securely therebetween.

Valve 10 includes a releasably mounted gear ratioing pump 60. Pump 60 is manufactured by Xolox, Inc. of Fort Wayne, Ind., and consists primarily of five separate sections: a carbonated water flow section 62, a carbonated water gear pump housing section 64, a spacer section 66, a syrup gear pump housing section 68, and a syrup flow section 70. These five sections are held together by a plurality of screws 72, and are sealed from each other by O-rings 74 extending through oval shaped grooves 75. Section 62 includes a carbonated water inlet channel 76 having a gear housing delivery orifice 78. In a similar manner, section 62 includes a carbonated water outlet channel 82 having a housing outlet orifice 84. Section 62 includes a carbonated water inlet leg 88 and a carbonated water outlet leg 90. Gear section 64 includes a figure-eight shaped pumping cavity 92 and a pair of oval carbonated water gears 94a and 94b. Gear 94a is keyed to a drive shaft 96 extending between and rotatively secured to sections 62 and 70. Gear 94b freely rotates around a fixed shaft 98 extending between sections 62 and 70. Gear section 68 includes a figure-eight shaped syrup pumping cavity 100 and includes a pair of syrup gears 102a and 102b therein. Gear 102a is fixedly secured to shaft 96 and gear 102b freely rotates round fixed shaft 98. Spacer section 66 includes a seal 104 for preventing fluid communication along shaft 96 between either of cavities 92 or 100. Housing section 70 is similar in structure and function as section 62 and includes a syrup inlet channel 106 terminating with a syrup cavity orifice 108. Section 70 also includes a syrup outlet channel 112 having a syrup pumping outlet cavity orifice (not shown). It will be appreciated by those of skill that the placement of the syrup cavity outlet orifice is the same as that with orifice 78. Also, as with section 62, pump section 70 includes a pair of legs and, specifically, a syrup inlet leg 116 and outlet leg 118.

Legs 88, 90, 116 and 118 include narrowed end portions 120 and semicircular grooves 124. Portions 124 provide for securing cooperation with U-shaped rod 126 extending through a pair of bores 128 extending into main body portion 12. Legs 88, 90, 116 and 118 also include reduced diameter ends 129 for insertion through O-rings 130. O-rings 130 rest on seats 131 at the bottom of leg retaining orifices 132, 134, 135, and 136. The manner of securing of pump 60 to valve body 12 can be understood whereby legs 88, 90, 116 and 118 are inserted into orifices 130, 132, 134, 136 respectively of body 12 whereby ends 120 thereof extend therein and provide for sealing engagement with O-rings 130. Pump 60 is then retained on valve body 12 by the insertion of rod 126 into cavities 128 for cooperating with leg grooves 124.

Figure 1:
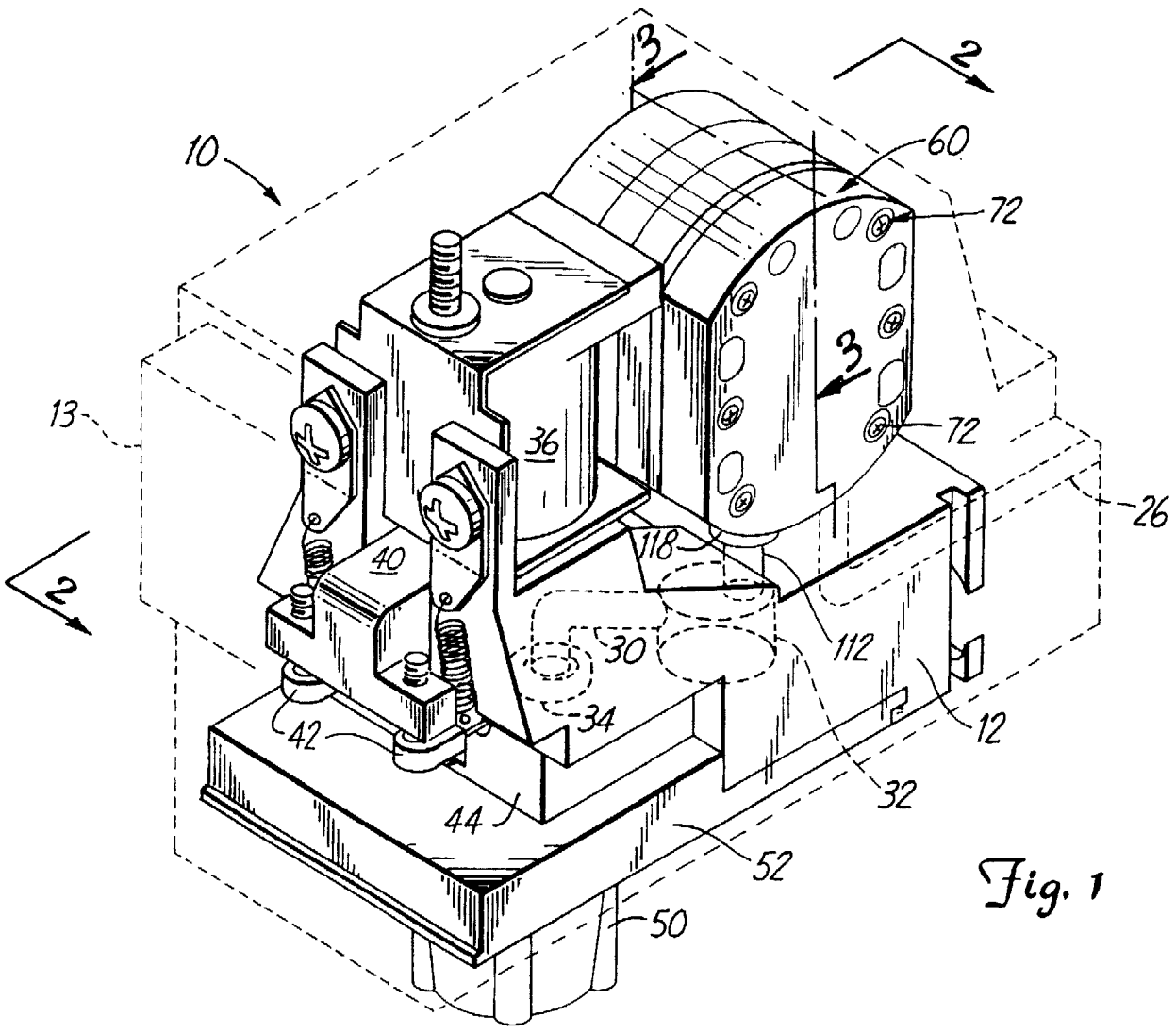
FIG. 1 shows a perspective view of the present invention.
Figure 2:
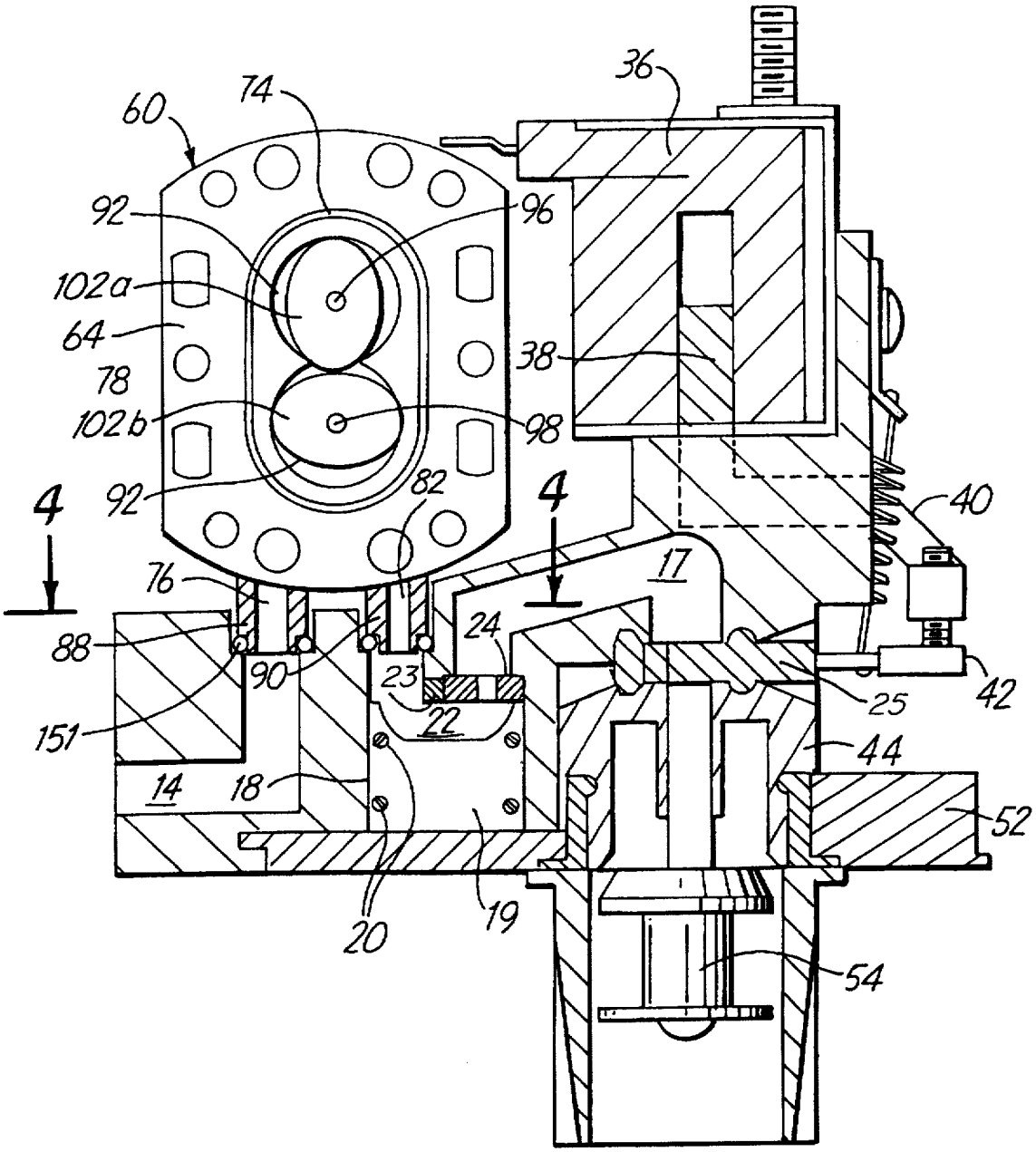
FIG. 2 shows a cross-sectional view along lines 2—2 of FIG. 3.
Figure 3:
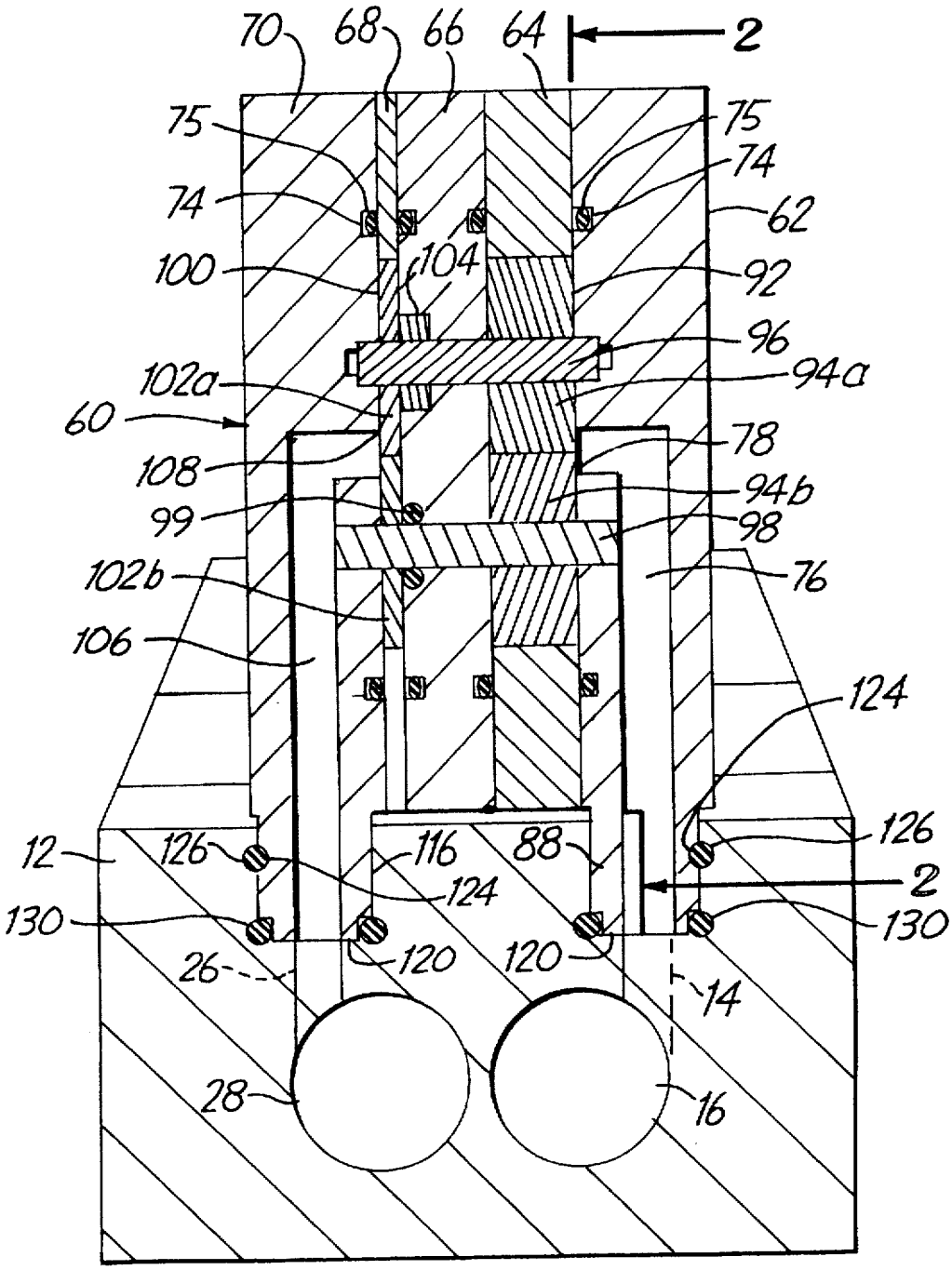
FIG. 3 shows a cross-sectional view along lines 3—3 of FIG. 1.
Figure 4:
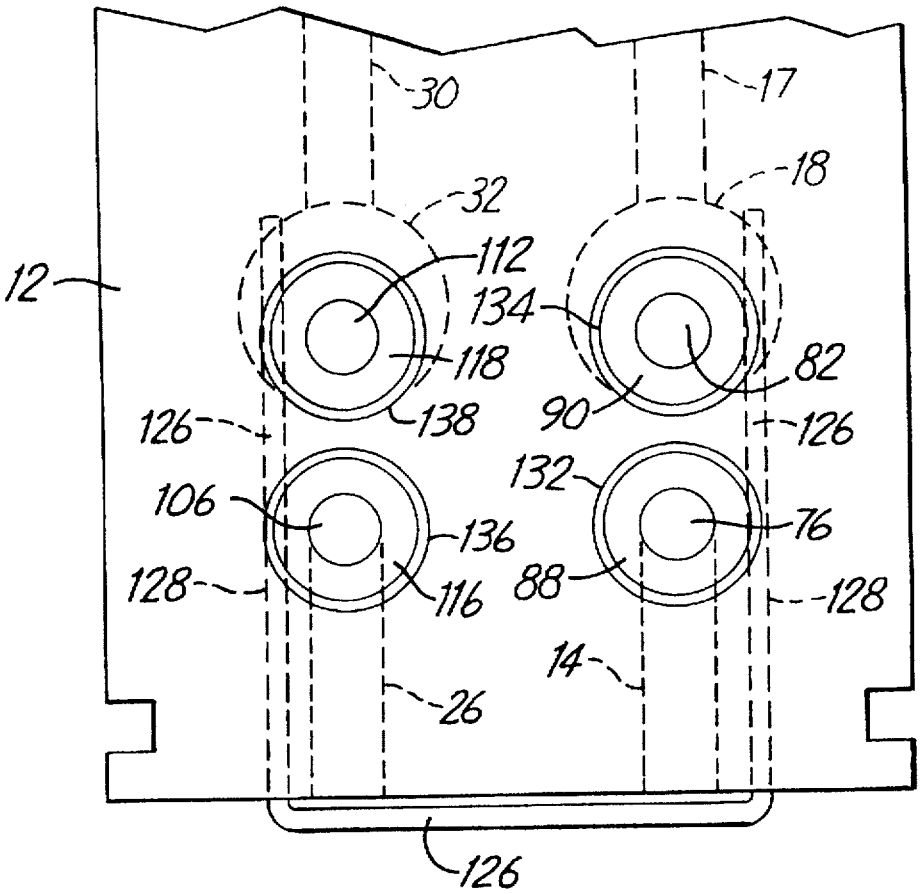
FIG. 4 shows a cross-sectional view along lines 4—4 of FIG. 2.

The operation of the present invention can be understood whereby operation of solenoid 36, through movement of rod 38, provides for simultaneous opening of pallet valves [24] *25* and 34 by depression of the operating arms 42 thereof by arm 40. In this manner, the carbonated water and syrup can flow through valve body 12 for dispensing out of nozzle 50. Specifically, and as will be understood by those of skill, the pressurized carbonated water is allowed to flow through channels 14 and 76 for delivery into cavity 92 through inlet 78. The carbonated water thus causes the rotating of gears 94a and 94b, as it flows there around in each half of cavity 92 to orifice 80. The direction of rotation of gears 94a and b is indicated by arrows in FIG. 2. Carbonated water then flows down channel 82 for ultimate delivery into a suitable receptacle held below nozzle 50. As gear 94a is keyed to rotating shaft 96, which in turn is keyed to gear 102a, it will be understood that the pressure of the carbonated water also provides for the simultaneous rotating of gears 102a and 102b and, therefore, the pumping of the particular syrup. Thus, as gear pairs 94a, 94b, and 102a, 102b are proportioned so the desired ratio of carbonated water and syrup is maintained, the proper ratio of the two beverage components will be continually delivered to the pallet valves. In the present invention, gears 94a and 94b have a large or elliptical diameter of approximately 1.5 cm and a width of approximately 0.6 cm. Thus, at a beverage dispensing flow rate of 1.5 oz. per second, gear pair 94a, 94b and 102a, 102b rotate at a speed of approximately 50 cycles per second (Hz). Washer 22 provides for maintaining the rotational speed of the gears at approximately 50 Hz. so that the desired flow rate is generally maintained. It will be appreciated that various flow control means can be used such as, a small orifice, a needle valve and so forth. Thus, the flow control represented by washer 24 does not provide for the [rotioing] *ratioing* of the two beverage components, but rather controls the rate of flow of the carbonated water, and therefor the syrup, through the valve. It can be understood that rounded groove 22 with valve body 12 forms a smooth passage for the carbonated water for minimizing any decarbonation thereof. Plug 19 is releasably secured between valve body 12 and plate 52 and allows for access to washer 24 so various flow washers can be used to allow for different flow regulation, as particular equipment or conditions may dictate.

Syrup flow space 32 can also include a flow regulating means such as a needle valve so the ratio between the syrup and carbonated water can be adjusted for a given gear pump architecture. In this manner, one gear pump could be used for a range of ratios of, for example, 4.5/1.0 to 5.5/1.0. It can also be appreciated that gears 102a and b pump the syrup, and therefore, the syrup does not need to be pressurized. Thus, the present invention has particular utility with "bag-in-box" syrup systems.

It can be understood that as pump body 60 is quickly detachable from valve body 12, the ratio of the beverage constituents can also be altered by the complete interchanging of pump bodies wherein the internal dimensions with respect to gearing and gear cavities thereof are varied to provide for the different ratios, as required.

It will be apparent to those of skill that various changes or modifications can be made to the present invention without exceeding the inventive scope thereof. For example, a gear pump could be used that includes circular gears. In the present invention elliptical gears were found to be preferred as the "sweep thereof" provides for the pumping of a greater volume of liquid per revolution as would be represented by the gear teeth alone of circular gears. Also, drive shaft 96 could be operated by drive means such as an electric motor to provide for the pumping of the beverage constituents.

We claim:

1. A constant ratio post-mix beverage dispensing valve comprising:

a valve body, the valve body having a carbonated water channel first portion and a syrup channel first portion, both first channel portions extending partially through the valve body from first portion first ends initiating at a valve body connecting end for providing connection to sources of carbonated water and syrup respectively and terminating at first portion second ends, and the valve body having a carbonated water channel second portion and a syrup channel second portion therein, both second channel portions extending partially through the valve body from second portion first ends and terminating at second portion second ends for communicating with valve means, the valve means for regulating flow of carbonated water and syrup from the sources thereof to a dispensing nozzle, the carbonated water second channel portion having a flow control means therein,

[a plug releasably insertable into the valve body, said plug including sealing means for sealing with the valve body, providing access to the flow control means, and having a top surface forming an interior surface portion of the carbonated water second channel portion,] and a gear ratioing means, the ratioing means having a housing for retaining a carbonated water gear pair and a syrup gear pair therein, one gear of each gear pair secured to a common drive shaft, and the carbonated water gear pair rotating within a carbonated water cavity and the syrup gear pair rotating within a syrup cavity, and each cavity fluidly separate from the other and having an inlet and an outlet, and the ratioing means sealably securable to the valve body so that both the syrup cavity and the carbonated water cavity inlets are in sealed fluid communication with the carbonated water and syrup channel first portion second ends respectively, and so that the syrup cavity and the carbonated water cavity outlets are in sealed fluid communication with the carbonated water and syrup channel second portion first ends respectively so that the carbonated water and syrup can flow through the ratioing means wherein a desired volume ratio between the carbonated water and syrup is maintained as a function of the relative size of the gear pairs to each other.

2. The dispensing valve as defined in claim [1] *21*, and the plug retained within the valve body by a retaining plate secure to the valve body bottom side.

3. The dispensing valve as defined in claim 2, and the flow control means comprising a flow control washer.

4. A constant ratio post-mix beverage dispensing valve, comprising:

a valve body, the valve body having a carbonated water channel first portion and a syrup channel first portion, both first channel portions extending partially through the valve body from first portion first ends initiating at a valve body connecting end for providing connection to sources of carbonated water and syrup respectively and terminating at first portion second ends, and the valve body having a carbonated water channel second portion and a syrup channel second portion therein, both second channel portions extending partially through the valve body from second portion first ends and terminating at second portion second ends for communicating with valve means, the valve means for regulating flow of carbonated water and syrup from the sources thereof to a dispensing nozzle, the syrup second channel portion having a flow control means therein, a plug releasably insertable into the valve body, said plug including sealing means for sealing with the valve body, providing access to the flow control means, and having a top surface forming an interior surface portion of the syrup second channel portion, and a gear ratioing means, the ratioing means having a housing for retaining a carbonated water gear pair and a syrup gear pair therein, one gear of each gear pair secured to a common drive shaft, and the carbonated water gear pair rotating within a carbonated water cavity and the syrup gear pair rotating within a syrup cavity, and each cavity fluidly separate from the other and having an inlet and an outlet, and the ratioing means sealably securable to the valve body so that both the syrup cavity and the carbonated water cavity inlets are in sealed fluid communication with the carbonated water and syrup channel first portion second ends respectively, and so that the syrup cavity and the carbonated water cavity outlets are in sealed fluid communication with the carbonated water and syrup channel second portion first ends respectively so that the carbonated water and syrup can flow through the ratioing means wherein a desired volume ratio between the carbonated water and syrup is maintained as a function of the relative size of the gear pairs to each other.

5. The dispensing valve as defined in claim 4, and the plug retained within the valve body by a retaining plate secured to the valve body bottom side.

6. The dispensing valve as defined in claim 5, and the so flow control means comprising a flow control washer.

7. A constant ratio post-mix beverage dispensing valve, comprising:

a valve body, the valve body having a carbonated water channel first portion and a syrup channel first portion, both first channel portions extending partially through the valve body from first portion first ends initiating at a valve body connecting end for providing connection to sources of carbonated water and syrup respectively and terminating at first portion second ends, and the valve body having a carbonated water channel second portion and a syrup channel second portion therein, both second channel portions extending partially through the valve body from second portion first ends and terminating at second portion second ends for communicating with valve means, the valve means for regulating flow of carbonated water and syrup from the sources thereof to a dispensing nozzle, the carbonated water second channel portion and the syrup second channel portion each having a flow control means therein, first and second plugs releasably insertable into the valve body, said first and second plugs including sealing means for sealing with the valve body, providing access to the flow control means in the carbonated water channel portion and the syrup channel portion respectively, and having a top surface forming an interior surface portion of the carbonated water second channel portion and the syrup second portion respectively, and a gear ratioing means, the ratioing means having a housing for retaining a carbonated water gear pair and a syrup gear pair therein, one gear of each gear pair secured to a common drive shaft, and the carbonated water gear pair rotating within a carbonated water cavity and the syrup gear pair rotating within a syrup cavity, and each cavity fluidly separate from the other and having an inlet and an outlet, and the ratioing means sealably securable to the valve body so that both the syrup cavity and the carbonated water cavity inlets are in sealed fluid communication with the carbonated water and syrup channel first portion second ends respectively, and so that the syrup cavity and the carbonated water cavity outlets are in sealed fluid communication with the carbonated water and syrup channel second portion first ends respectively so that the carbonated water and syrup can flow through the ratioing means wherein a desired volume ratio between the carbonated water and syrup is maintained as a function of the relative size of the gear pairs to each other.

8. The dispensing valve as defined in claim 7, and the plugs retained within the valve body by a retaining plate secured to the valve body bottom side.

9. The dispensing valve as defined in claim 8, and the flow control means comprising a flow control washer.

10. A constant ratio post-mix beverage dispensing valve, comprising:

a valve body, the valve body having a carbonated water channel first portion and a syrup channel first portion, both first channel portions extending partially through the valve body from first portion first ends initiating at a valve body connecting end for providing connection to sources of carbonated water and syrup respectively and terminating [of] *at* first portion second ends, and the valve body having a carbonated water channel second portion and a syrup channel second portion therein, both second channel portions extending partially through the valve body from second portion first ends and terminating at second portion second ends for communicating with valve means, the valve means for regulating flow of carbonated water and syrup from the sources thereof to a dispensing nozzle, a gear ratioing means, the ratioing means having a housing for retaining a carbonated water gear pair and a syrup gear pair therein, one gear of each gear pair secured to a common drive shaft, and the carbonated water gear pair rotating within a carbonated water cavity and the syrup gear pair rotating within a syrup cavity, and each cavity fluidly separate from the other and having an inlet and an outlet, and the ratioing means having a pair of inlet legs and a pair of outlet legs extending from a lower end of the housing thereof, the inlet legs having channels extending there through for fluidly communicating with the carbonated water and syrup cavity inlets respectively, and the outlet legs having channels extending there through for fluidly communicating with the carbonated water and syrup cavity outlets respectively, and the valve body having a ratioing means receiving top surface, and the first channel second ends and second channel first ends terminating on the top surface with carbonated water and syrup inlet leg receiving apertures and carbonated water and syrup outlet leg receiving apertures respectively, the apertures including sealing means for providing fluid sealing with the inlet and outlet legs when inserted therein so that the carbonated water and syrup can flow through the ratioing means wherein a desired volume ratio between the carbonated water and syrup is maintained as a function of the relative size of the gear pairs to each other, and the dispensing valve having releasable retaining means operable to secure the rationing means to the valve body when the legs thereof are inserted into the apertures.

11. The dispensing valve as defined in claim 10, and the carbonated water second channel portion having a flow control means therein.

12. The dispensing valve as defined in claim 9, and including a plug releasably insertable into a bottom side of the valve body opposite from the top surface, the plug including sealing means for sealing with the valve body and the plug providing access to the flow control means.

13. The dispensing valve as defined in claim 12, and the plug having a top surface the plug top surface including a rounded groove forming a smooth interior surface portion of the second channel.

14. The dispensing valve as defined in claim 13, and the plug retained within the valve body by a retaining plate secured to the valve body bottom side.

15. The dispensing valve as defined in claim 14, and the flow control means comprising a flow control washer.

16. The dispensing valve as defined in claim 10, and the syrup second channel portion having a flow control means therein.

17. The dispensing valve as defined in claim 16, and including a plug releasably insertable into a bottom side of the valve body opposite from the top surface, the plug including sealing means for sealing with the valve body and the plug providing access to the flow control means.

18. The dispensing valve as defined in claim 17, and the plug having a top surface the plug top surface including a rounded groove forming a smooth interior surface portion of the second channel.

19. The dispensing valve as defined in claim 18, and the plug retained within the valve body by a retaining plate secured to the valve body bottom side.

20. The dispensing valve as defined in claim 19, and the flow control means comprising a flow control washer.

*21. The dispensing valve as defined in claim 1 and further including a plug releasably insertable into the valve body, said plug including sealing means for sealing with the valve body and for providing access to the flow control means.*

*22. The dispensing valve as defined in claim 21, and the flow control means comprising a flow washer.*

*23. The dispensing valve as defined in claim 1 and the syrup channel second portion having a flow control means therein.*

*24. A constant ratio post-mix beverage dispensing valve comprising:*

*a valve body, the valve body having a carbonated water channel first portion and a syrup channel first portion, both first channel portions extending partially through the valve body from first portion first ends initiating at a valve body connecting end for providing connection to sources of carbonated water and syrup respectively and terminating at first portion second ends, and the valve body having a carbonated water channel second portion and a syrup channel second portion therein, both second channel portions extending partially through the valve body from second portion first ends and terminating at second portion second ends for communicating with valve means, the valve means for regulating flow of carbonated water and syrup from the sources thereof to a dispensing nozzle,*

*the syrup channel second portion having a flow control means therein, and a gear ratioing means, the ratioing*

*means having a housing for retaining a carbonated water gear pair and a syrup gear pair therein, one gear of each gear pair secured to a common drive shaft, and the carbonated water gear pair rotating within a carbonated water cavity and the syrup gear pair rotating within a syrup cavity, and each cavity fluidly separate from the other and having an inlet and an outlet, and the ratioing means sealably securable to the valve body so that both the syrup cavity and the carbonated water cavity inlets are in sealed fluid communication with the carbonated water and syrup channel first portion second ends respectively, and so that the syrup cavity and the carbonated water cavity outlets are in sealed fluid communication with the carbonated water and syrup channel second portion first ends respectively so that the carbonated water and syrup can flow through the ratioing means wherein a desired volume ratio between the carbonated water and syrup is maintained as a function of the relative size of the gear pairs to each other.*

*25. The dispensing valve as defined in claim 24, and the flow control means comprising a flow washer.*

*26. The dispensing valve as defined in claim 24 and further including a plug releasably insertable into the valve body, said plug including sealing means for sealing with the valve body and for providing access to the flow control means.*

*27. The dispensing valve as defined in claim 26, and the flow control means comprising a flow washer.*

* * * * *